(12) United States Patent
Raha

(10) Patent No.: US 6,558,164 B2
(45) Date of Patent: May 6, 2003

(54) METHOD AND SYSTEM FOR SIMULATING TRAVEL

(75) Inventor: Mohua Raha, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 38 days.

(21) Appl. No.: 09/871,964

(22) Filed: Jun. 4, 2001

(65) Prior Publication Data

US 2002/0182569 A1 Dec. 5, 2002

(51) Int. Cl.[7] .................................................. G09B 9/02
(52) U.S. Cl. .......................................... 434/62; 434/69
(58) Field of Search .............................. 434/29, 30, 33, 434/35, 36, 38, 41, 43, 44, 61, 62, 69

(56) References Cited

U.S. PATENT DOCUMENTS

| | | | | |
|---|---|---|---|---|
| 5,660,547 A | * | 8/1997 | Copperman ................... 434/29 |
| 5,796,991 A | * | 8/1998 | Shimizu ......................... 703/1 |
| 5,995,903 A | * | 11/1999 | Smith et al. ................. 340/995 |
| 6,146,143 A | * | 11/2000 | Huston et al. ............... 345/620 |
| 6,216,088 B1 | * | 4/2001 | Schulz et al. ............... 701/117 |
| 6,336,072 B1 | * | 1/2002 | Takayama et al. .......... 340/995 |

OTHER PUBLICATIONS

Wagstaff, Patty; "Aviation Industry Lines Up Behind Flight Simulator 2000", Oct. 1999; PR Newswire.*

* cited by examiner

*Primary Examiner*—John Edmund Rovnak

(57) ABSTRACT

A method and device to simulate travel is disclosed. A user may simulate a travel, which can be for either business or for pleasure, before the user actually travels. By simulating the travel before hand, a measure of predictability is introduced for the user during the actual travel. The travel simulation may simulate conditions such as the weather and traffic patterns for cars, trains, buses, planes, and the like. The conditions are dynamically adjusted in response to the user's inputs. The travel may be simulated for individuals who are not able to take an actual trip due to health and or other reasons.

23 Claims, 5 Drawing Sheets

METHOD AND SYSTEM FOR SIMULATING TRAVEL

FIELD OF THE INVENTION

This invention relates generally to an environmental simulation system. More particularly, the invention relates to travel simulation systems capable of simulating traveling conditions of places including weather, driving, and other environmental conditions.

BACKGROUND OF THE INVENTION

Simulation systems exist for specialized training such as flight simulation for airplane pilots. Such simulation systems simulate visual as well as audio aspects of flights to train the pilots for emergency landings, equipment learning, new plane working trainings, and the like.

However, these systems are very expensive and are not generally available to the public. Also, a specialized system, such as the flight simulator, is not a generic solution in the area of simulations. The general public has very little use of such specialized simulation systems.

In addition, most or all simulators simulate "made-up" environments. For example, game simulators simulate the conditions of the virtual game world. Most simulators do not account for the "real-life" environmental conditions such as the weather, traffic patterns, road hazards, etc. Further more, most simulators also do not account for the dynamically changing nature of the environment.

SUMMARY OF THE INVENTION

In accordance with an aspect of the present invention, a travel simulating system includes an environmental information supplier configured to transmit environmental information related to environmental conditions based on a plurality of inputs from a user; a travel information supplier configured to transmit travel information related to travel based on the plurality of user inputs and the information related to environmental conditions; and a travel simulator configured to receive the environmental information, the travel information, and the plurality of user inputs to simulate travel.

In accordance with another aspect of the principles of the invention, a method to simulate travel includes receiving a plurality of inputs from a user; retrieving environmental information based on the plurality of user inputs; retrieving travel information based on one or more of the plurality of user inputs and the environmental information; and simulating travel based on one or more of the plurality of user inputs, the environmental information, and the travel information.

In accordance with a further aspect of the principles of the invention, a travel simulation system includes a travel simulator configured to simulate traveling conditions based on plurality of user inputs, wherein the plurality of user inputs include at least one of source, destination, time, method of travel and type of travel; a weather data supplier configured to transmit weather information to the travel simulator, wherein the weather information includes one of a predicted weather condition based on the plurality of user inputs from a weather information database and an actual weather condition also based on the plurality of user inputs; an obstruction data supplier configured to transmit obstruction information to the travel simulator, wherein the obstruction information includes one of a predicted obstruction information based on the plurality of user inputs from an obstruction information database and an actual obstruction condition also based on the plurality of user inputs; a travel information supplier configured to transmit travel information to the travel simulator based on the plurality of user inputs and the weather and obstruction information, wherein the travel information includes one or more of preferred travel directions, alternate travel directions, and sights.

Certain advantages follow from certain embodiments of the invention. For example, the simulation system is useful to the general public. Also, the system can be implemented less expensively than a specialized system, such as the flight simulator. Further, the system provides a user with virtual travel depicting realistic environmental and traveling conditions so that a measure of predictability is introduced when the user actually takes the trip. Still further, the system is updateable with current conditions, such as environmental and traveling, so that the environmental and travel conditions may be dynamically adjusted and the future predictions may become more accurate. Still further, the system provides a virtual travel experience to those who are unable to make a trip, because of a disability, illness, or the like.

BRIEF DESCRIPTION OF THE DRAWINGS

Features and advantages of the present invention will become apparent to those skilled in the art from the following description with reference to the drawings, in which.

DETAILED DESCRIPTION

For simplicity and illustrative purposes, the principles of the present invention are described by referring mainly to exemplary embodiments thereof. However, one of ordinary skill in the art would readily recognize that the same principles are equally applicable to all types of simulators that simulate realistic conditions and need not be limited specifically to travel simulation systems.

As discussed above, specialized simulation systems, such as the flight simulator, generally has minimal utility for the general public. However, a member of the general public who travels may use the travel simulation system to simulate a trip before actually taking the trip. In this way, the traveler will be more familiar with the target destination and associated pitfalls encountered during travel may be avoided or properly dealt with. They may include expected traffic jams and weather, road constructions, and the like.

Also, the travel simulation system may provide simulated pleasure travel. For example, a person with disabilities may not be able to take an actual trip to a destination, and thus cannot sight-see on an actual trip. The simulated pleasure travel substantially eliminates the physical and mental stresses associated with traveling such as packing, long lines at the airport, and the like. Also, the travel simulation system may provide simulated sight-seeing.

Figure 1:
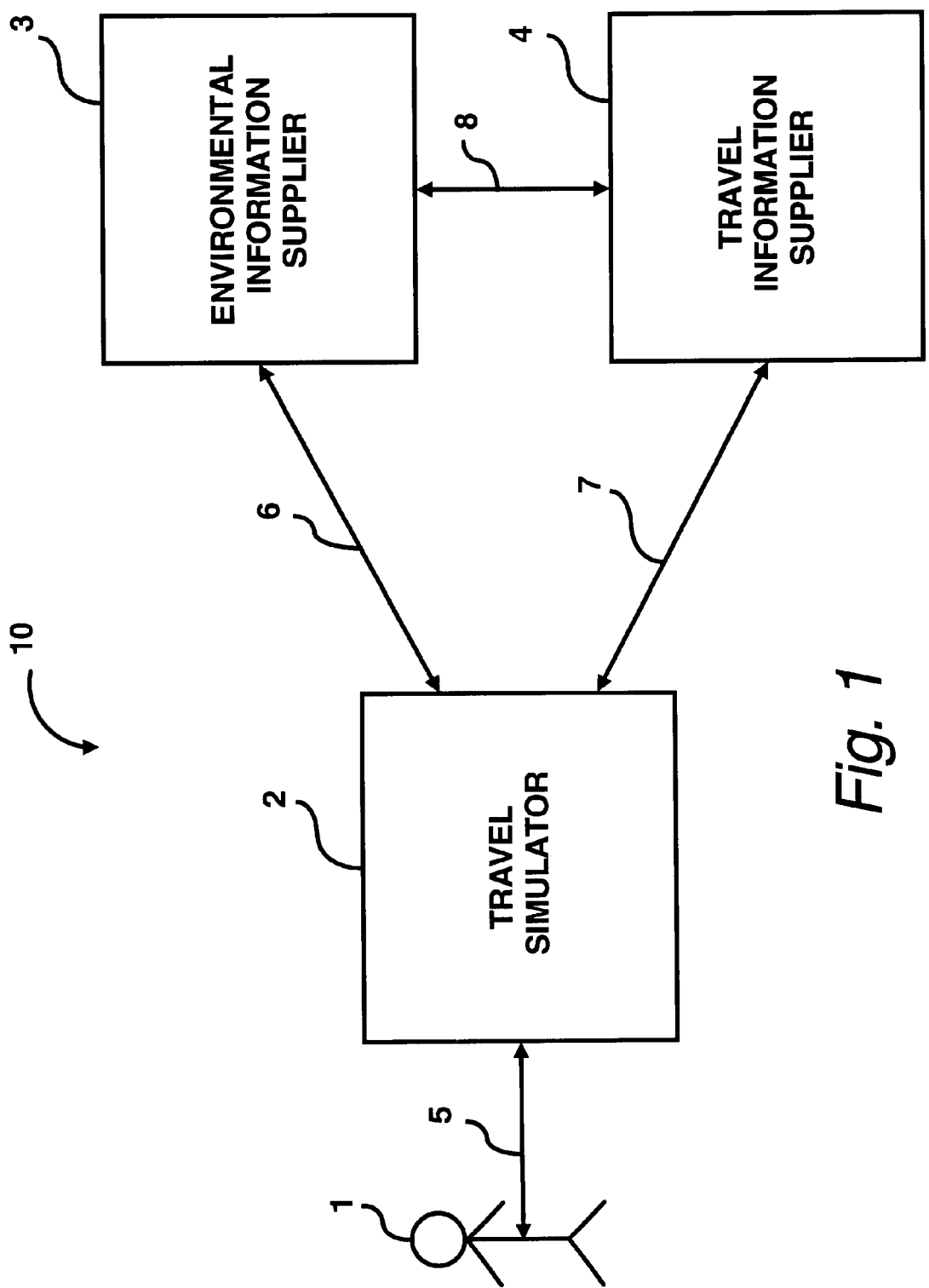
FIG. 1 illustrates a block diagram of an exemplary embodiment of a travel simulating system according to the principles of the present invention.

FIG. 1 illustrates a block diagram of an exemplary embodiment of a travel simulating system 10 according to the principles of the present invention. In FIG. 1, a user 1 communicates with a travel simulator 2 through a connection 5, an environmental information supplier 3 communicates with the travel simulator 2 through a connection 6, and a travel information supplier 4 communicates with the travel simulator 2 through a connection 7. Also, the environmental information supplier 3 and the travel information supplier 4 communicate with each other through a connection 8.

Figure 5:
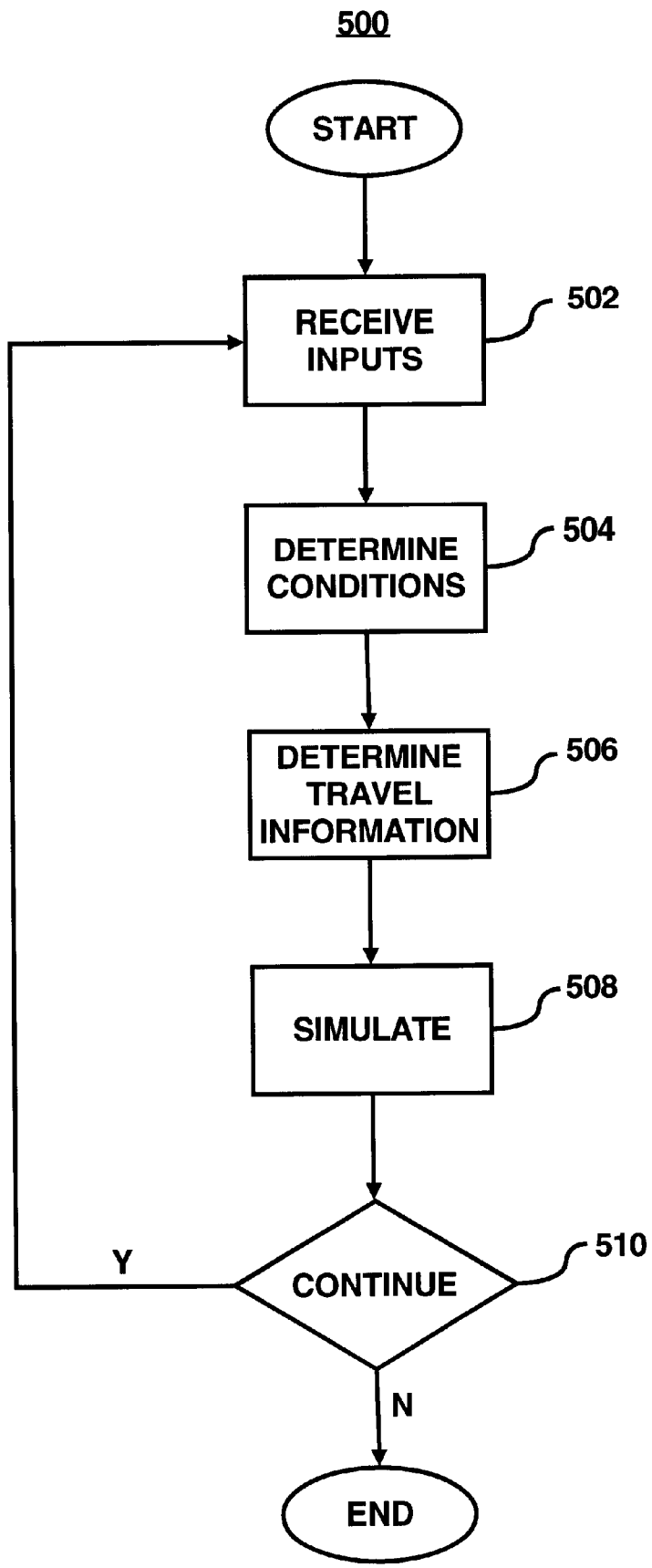
FIG. 5 illustrates a flow diagram of an exemplary embodiment of a method to simulate travel according to the principles of the present invention.

The operation of the travel simulating system 10 may be as follows. FIG. 5 illustrates a flow diagram of an exemplary embodiment of a method to simulate travel according to the principles of the present invention. With reference to FIG. 5, the travel simulator 2 receives inputs from the user 1 in step 502. The simulation attributes include information for generating the simulation. The attributes may include information regarding a starting point, destination, date and time of travel, method of travel (automobile, train, walking, etc.), type of travel (business, pleasure, etc.), travel options (cheapest, fastest, include famous sights, etc.), and the like.

For example, a business traveler may want to simulate travel from Dulles International Airport to downtown Washington, D.C. on July 17th, and the traveler's plane is due to land at 3:30 PM. The attributes would include the starting point (e.g., Dulles International Airport), destination (e.g., Washington, D.C.), date and time of travel (e.g., July 17th at 3:30 PM), method of travel (e.g., taxi), and travel option (e.g., fastest).

In step 504, the environmental information supplier 3 supplies the environmental information, which may be based on the simulation attributes, to the travel simulator 2. Taking the example attributes stated above, a predicted environmental information may be generated. The predicted environmental information may include a traffic jam (e.g., for travel in the midst of rush hour), a high humidity (e.g., for a summer afternoon in Washington area), and the like.

Also, actual conditions may be generated. For example, if July 17th is tomorrow, then the actual weather forecast may be substituted. In addition, obstructions that may effect the travel may also be simulated. The obstructions may include road constructions, road closings, natural disasters (such as mud slides), and the like.

In step 506, the travel information supplier 4 supplies the travel information, which may be based on the simulation attributes and/or the environmental information, to the travel simulator 2. The travel information may include a preferred route or routes, an alternate route or routes, intermediate time stamp points, and the like.

In step 508, the travel simulator 2 may simulate the travel based on the environmental and travel information. Then in step 510, the user may choose to simulate another scenario, at which the user is directed to step 502. Alternatively, the user may choose to end the simulation.

Note that simulation may be based on continuous user inputs. For example, the user may actually drive in the simulation. In these instances, dynamic adjustments may be needed. During the simulation, the user may unexpectedly turn left instead of turning right as instructed. Then the simulating system 10 may recalculate the route, taking into account the simulated current position, the weather, and obstructions, and continue with the simulation. The dynamic adjustment may include making adjustments to environmental information and the travel information.

Referring back to FIG. 1, the connections 6, 7, and 8 connecting the travel simulator 2, environmental supplier 3, and the travel information supplier 4, are all bi-directional. This facilitates communications so that all three components work together to dynamically adjust the simulation. In other words, the travel simulator 2 may receive updated environmental information from the environmental information supplier 3 and may receive updated travel information from the travel information supplier 4.

To generate the updated environmental information, the environmental information supplier 4 may require user inputs information and the travel information provided by the travel simulator 2 and the travel information supplier 4, respectively. Also to generate the updated travel information, the travel information supplier 4 may require user inputs information and the environmental information provided by the travel simulator 2 and the environmental information supplier 3, respectively.

The connections 6, 7, and 8 may be implemented in a variety of ways. For example, the connections may be through the Internet, a cable (hardwired), internal networks, wireless nodes, and the like.

Figure 2:
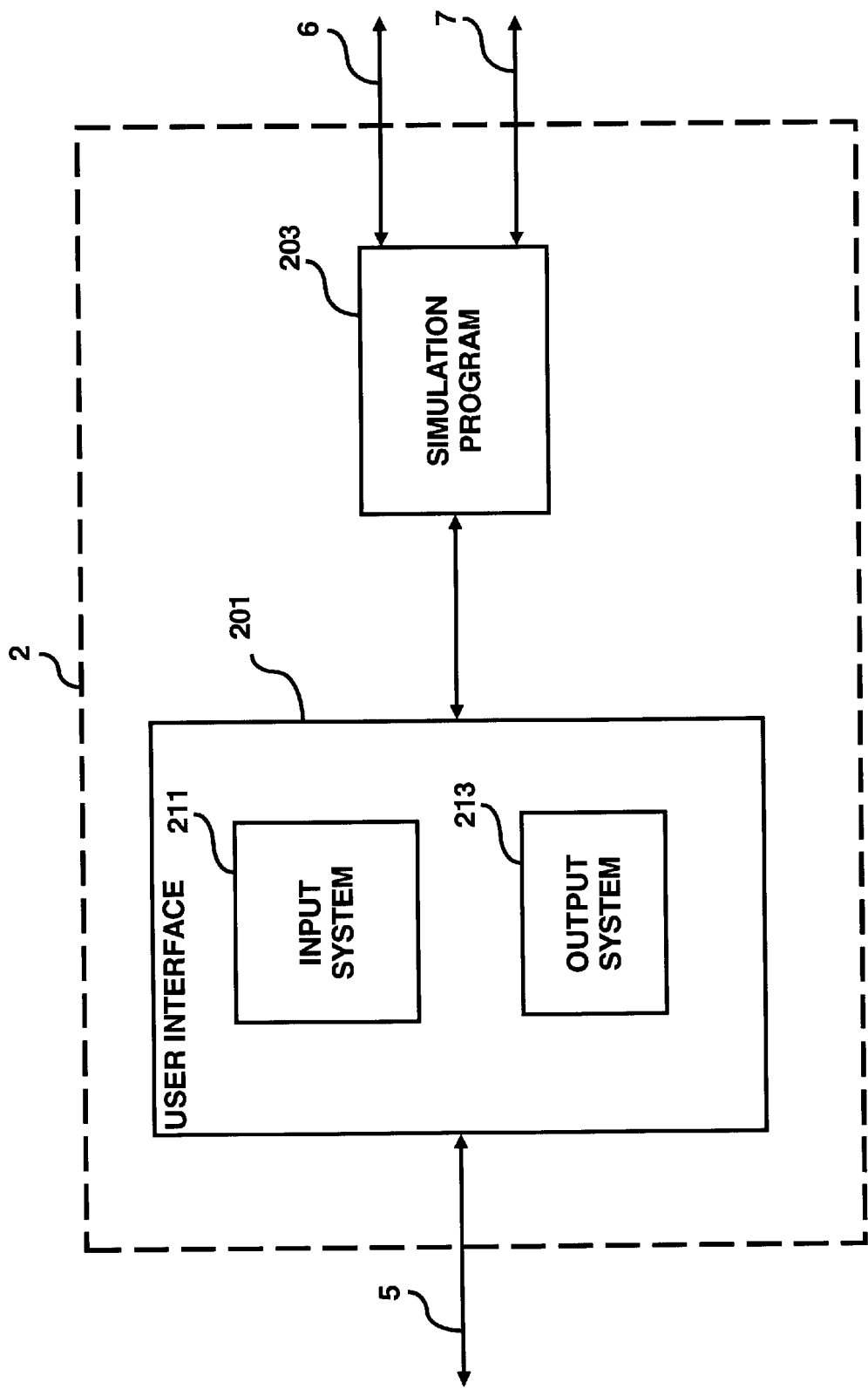
FIG. 2 illustrates a block diagram of a detailed exemplary embodiment of a travel simulator shown in FIG. 1.

FIG. 2 illustrates a block diagram of a detailed exemplary embodiment of the travel simulator 2 shown in FIG. 1. The travel simulator 2 may include a user interface 201 and a simulation program 203. The user interface 201 may be configured to receive inputs from the user 1, which are inputted to the simulation program 203. The user interface 201 may also be configured to receive simulation data from the simulation program 203 for displaying to the user 1. The user interface 201 may also perform translation of the simulation data before displaying the data to the user 1, if necessary. For example, the data from the simulation data may simply be a stream of binary numbers. The user interface 201 would translate the stream to appropriate audio and visual signals discernible to the user. However, the senses stimulated is not limited to just hearing and sight. The user interface 201 may also translate the stream to stimulate smell, touch, and even perhaps taste senses.

The user interface 201 may be any combination of input and output systems 211 and 213 configured to receive and send information, respectively. Examples of input system (not shown) includes one or more of a keyboard, a pointing device such as a mouse, specialized input devices such as automobile-style input device (e.g., steering wheel, accelerator, brake, clutch, and the like), tactile input device, and the like. Examples of output system (not shown) includes monitors, a head-mounted displays (HMD), panoramic viewing screens, tactile output devices, and the like.

The user interface 201 may also include an artificial intelligence device (not shown) that is configured to have functionalities of both the input and output systems. The user interface 201 may also translate the information from one format to another. Indeed, the user interface 201 may include a virtual reality interface so that the user may actually experience the simulated environmental conditions.

The simulation program 203, which performs some or all of the steps shown in FIG. 5, generates the simulation data based on user inputs, the environmental information from the environmental information supplier 3 and the travel information from the travel information supplier 4. The generated simulation data, which is translated if necessary, is displayed by the user interface 201 to the user 1. The simulation program 3 maybe implemented in hardware, software, or a combination thereof.

Figure 3:
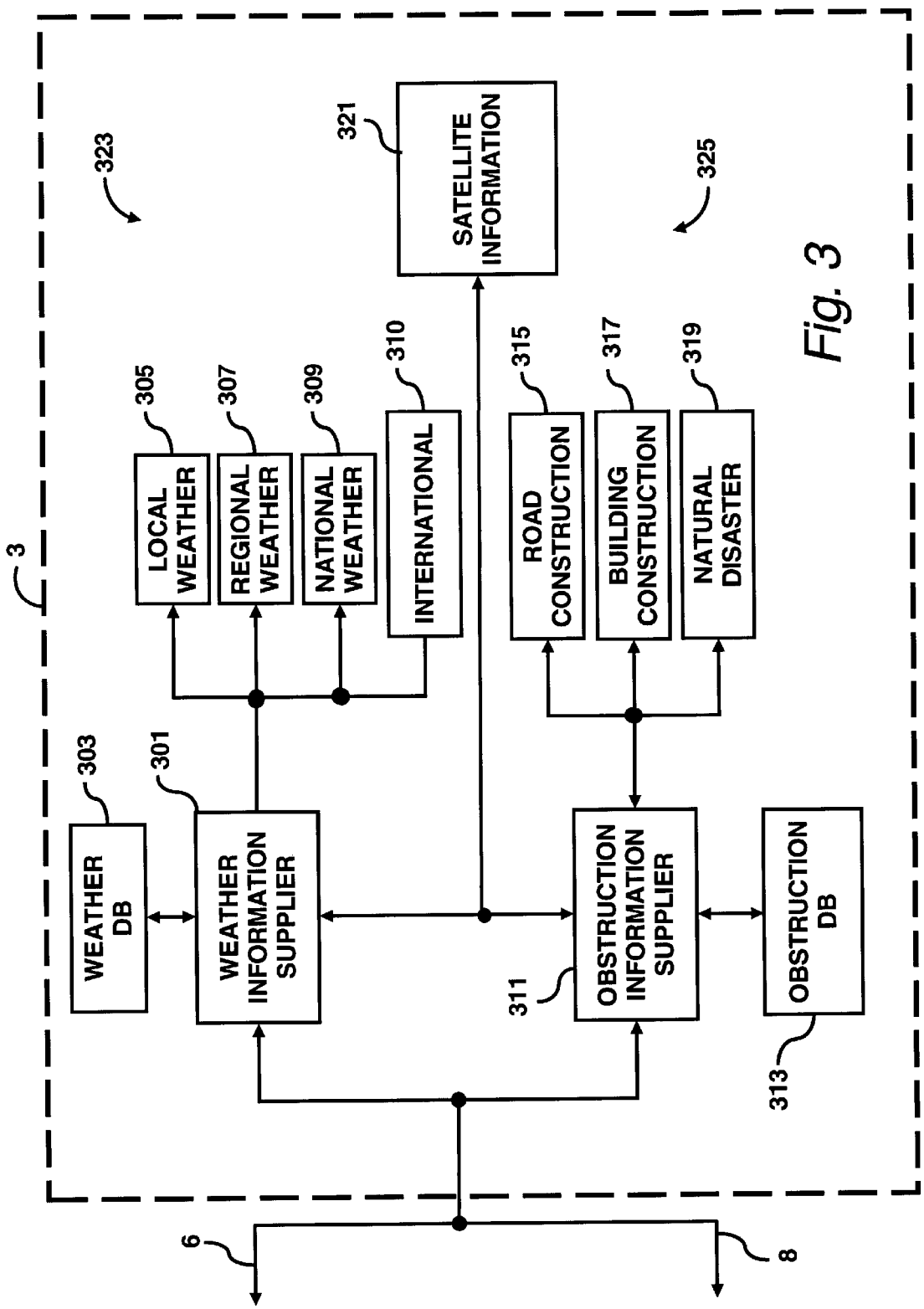
FIG. 3 illustrates a block diagram of a detailed exemplary embodiment of an environmental information supplier shown in FIG. 1.

FIG. 3 illustrates a block diagram of a detailed exemplary embodiment of the environmental information supplier 3, shown in FIG. 1, that supplies the environmental information to the travel simulator 2 and/or the travel information supplier 4 via connections 6 and 8, respectively. The environmental information supplier 3 may be generally divided into two sections. The first section is the weather data section 323, which generally relates to providing weather data. The second section is the obstruction data section 325, which generally relates to providing obstruction data.

The weather data section 323 may include a weather data supplier 301 configured to transmit the weather information to the travel simulator 2. The weather may be predicted (e.g., based on past history) or actual (e.g., based on up to date forecasts). The weather data section may also include a weather database 303 connected to the weather data supplier 301. The weather database 303 may include past weather information, which may be used to predict future weather conditions. For example, the weather database 303 may show that a majority of rain fall occurs during the months of June, July, and August for a particular locality.

The weather data section may include one or more current weather data sources connected to the weather data supplier 301. The current weather data sources may include a local source 305, a regional source 307, a national source 309, an international source 310, and the like. The current weather data source may also include satellite source 321. The weather database 303 may be updated with any of the current weather data sources. Such updates increase the accuracy of future weather predictions.

The obstruction data section 325 may include an obstruction data supplier 311 configured to transmit the obstruction information to the travel simulator 2. The obstruction could be either predicted (e.g., based on past history) or actual (e.g., based on up to date construction information). The obstruction data section may also include an obstruction database 313 connected to the obstruction data supplier 311. The obstruction database 313 may include past obstruction information, which may be used to predict future obstruction conditions. For example, the obstruction database 313 may show that because summer is a tourist season for a particular locality, and certain streets may be closed for automobile traffic in that locality.

The obstruction data section may further include one or more current obstruction data sources connected to the obstruction data supplier 311. The current obstruction data sources may include one or more of a road construction source 315, a building construction source 317, a natural disaster source 319, and the like. The current obstruction data source may also include the satellite source 321. The obstruction database 313 may be updated with any of the current obstruction data sources. Such updates increase the accuracy of future obstruction predictions.

It should be noted that the connections between the components of the environmental information supplier 3, e.g., between the weather information supplier 301 and the national weather source 309 may be implemented by the Internet, cables, internal networks, wireless nodes, and the like.

Figure 4:
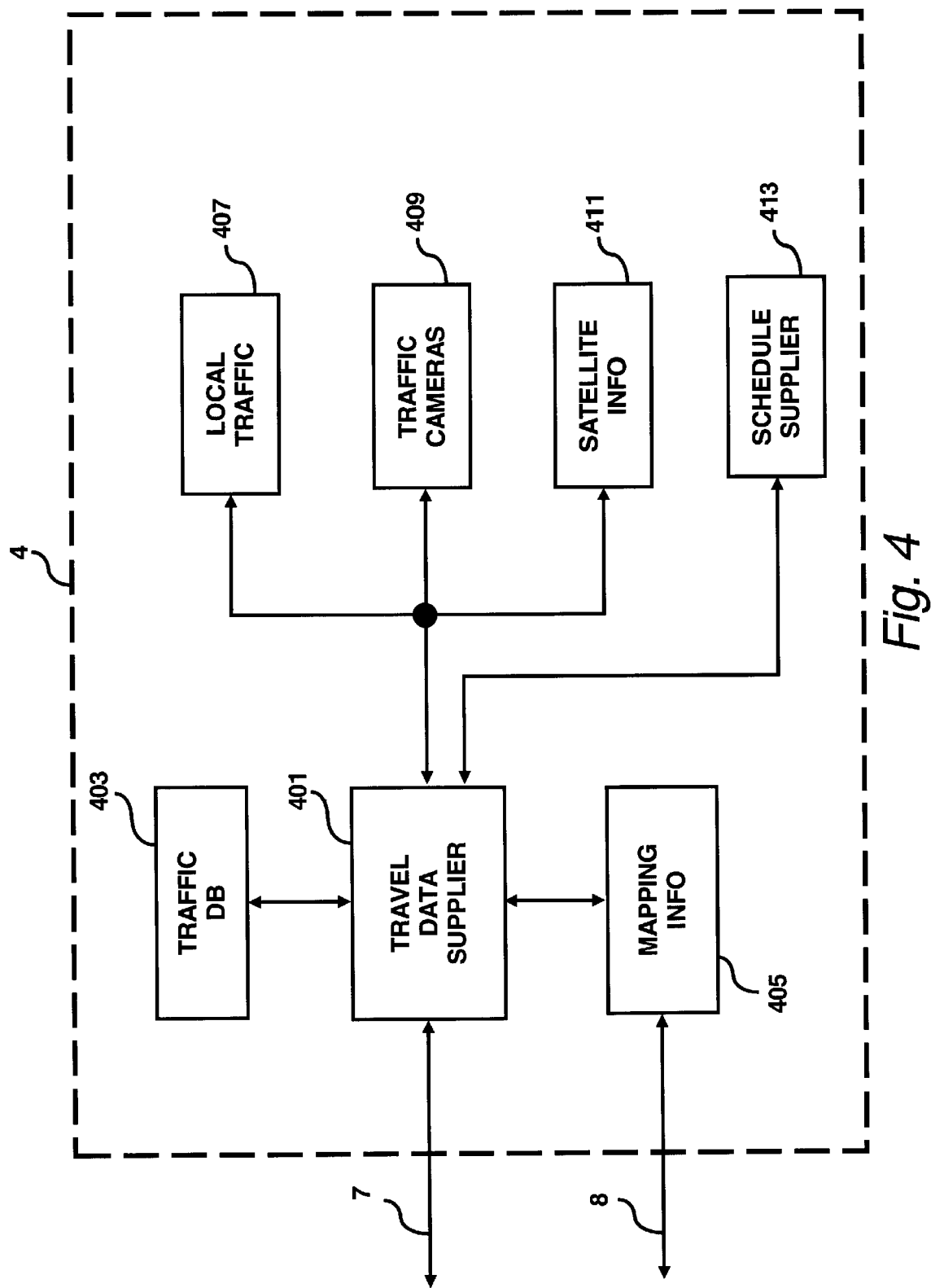
FIG. 4 illustrates a block diagram of a detailed exemplary embodiment of a travel information supplier shown in FIG. 1.

FIG. 4 illustrates a block diagram of a detailed exemplary embodiment of the travel information supplier 4, shown in FIG. 1, that supplies the travel information to the travel simulator 2 and/or the environmental information supplier 3 via connections 7 and 8, respectively. As shown in FIG. 4, the travel information supplier 4 may include a travel data supplier 401 configured to transmit the travel information to the travel simulator 2. The travel information could be either predicted (for e.g., based on past history) or actual (for e.g., based on up to date mapping information). The travel information supplier 4 may also include a traffic database 403 connected to the travel data supplier 401. The traffic database 403 may include past traffic information, which may be used to predict future traffic. For example, information in the traffic database 403 may include heavy volume of traffic on a particular highway between 4:00 PM and 6:00 PM on weekdays.

The travel information supplier 4 may include a mapping information source 405. In conjunction with the travel data supplier 4, the mapping information source 405 provides the routes (preferred and alternate) for the simulation.

The travel information supplier 4 may further include one or more current traffic information sources. The current traffic information sources may include local traffic updates 407, traffic cameras 409, satellite 411, and the like. Note that the traffic database 403 may be updated with information from any of the current traffic information sources. Such updates enables future traffic predictions to be more accurate.

In addition, the travel data supplier 401 may receive schedules from a schedule supplier 413. The schedule maybe about arrival and departure times of planes, trains, buses, and the like. Further, the travel data supplier 401 may be supplied with environmental information from the environmental information supplier 3. This enables the travel data supplier to determine various routes for the traveler available from the source to destination targets based on plurality of user inputs and updated weather and obstruction information.

Much like the environmental information supplier shown in FIG. 3, it should be noted that the connections between the components of the travel information supplier 4, e.g., between the travel data supplier 401 and the traffic cameras 409 may be implemented by the Internet, internal networks, cables, wireless nodes, and the like.

Advantages of the embodiments of the present invention include being useful to the general public, being relatively less expensive than some specialized simulation systems, enabling virtual travel for those unable to take an actual, introducing predictability for a real trip, and dynamically adjusting conditions of the trip.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Also, the labels given to the steps of the methods in the claims are for reference purposes only. Unless otherwise specified, the labels given to the steps of the method claims do not imply any ordering of the steps. Those skilled in the art will recognize that these and other variations are possible within the spirit and scope of the invention as defined in the following claims and their equivalents.

What is claimed is:

1. A travel simulating system, comprising:
an environmental information supplier configured to transmit environmental information related to environmental conditions based on a plurality of inputs from a user, wherein the environmental information includes at least actual environmental information;

a travel information supplier configured to transmit travel information related to travel based on said plurality of user inputs and said information related to environmental conditions, wherein the travel information includes at least an actual travel information; and a travel simulator configured receive said environmental information, said travel information, and said plurality of user inputs to simulate a travel, wherein said travel simulator is configured to dynamically adjust to deviation from planned travel routes.

2. The system of claim 1, wherein said travel simulator comprises:

a user interface configured to receive said plurality of user inputs from said user and to send simulation information to said user; and a simulation program generating said simulation information to said user interface based on one or more of said plurality of user inputs, said environmental information, and said travel information.

3. The system of claim 2, wherein said plurality of user inputs include a plurality of simulation attributes, and said plurality of simulation attributes includes one or more of a source, a destination, time, a method of travel, a type of travel, and a travel option.

4. The system of claim 2, wherein said user interface comprises:

an input system configured to receive said plurality of user inputs and transmit said plurality of user inputs to said simulation program; and an output system configured to receive said simulation information, including audio and visual information, from said simulation program for displaying to said user.

5. The system of claim 4, wherein:

said input system comprises one or more of a keyboard, a pointing device, an automobile-style input device, and a tactile input device; and said output system comprises one or more of a head-mounted display (HMD), speaker, a panoramic viewing screen, and a tactile output device.

6. The system of claim 4, wherein said user interface includes at least one of:

an artificial intelligence device configured to serve as both said input and output systems; and a virtual reality interface device configured to serve as both said input and output systems.

7. The system of claim 2, wherein said simulation program is implemented in one or both of hardware and software.

8. The system of claim 1, wherein said travel simulator is configured to dynamically adjust said generation of said simulation information based on one or more of said plurality of user inputs, said environmental information, and said travel information.

9. The system of claim 1, wherein said environmental information supplier comprises at least one of:

a weather data supplier configured to transmit said weather information to said travel simulator, wherein said weather information includes one of a predicted weather condition and an actual weather condition; and a obstruction data supplier configured to transmit said obstruction information to said travel simulator, wherein said obstruction information includes one of a predicted obstruction and an actual obstruction.

10. The system of claim 9, wherein said environmental information supplier further comprises at least one of:

a current weather data source configured to transmit a current weather data to said weather data supplier, wherein said current weather data source includes at least one of local, regional, national, international, and satellite sources;

a weather database configured to perform one or both of transmitting said predicted weather condition to said weather data supplier and updating information within said weather database with said current weather data;

a current obstruction data source configured to transmit a current obstruction data to said obstruction data supplier, wherein said current obstruction data source includes at least one of road construction, building construction, a natural disaster, and said satellite sources; and an obstruction database configured to perform one or both of transmitting said predicted obstruction condition to said obstruction data supplier and updating information within said obstruction database with said current obstruction data.

11. The system of claim 1, wherein said environmental information supplier is configured to dynamically adjust said transmission of said environmental information based on one or both of said plurality of user inputs and said travel information.

12. The system of claim 1, wherein said travel information supplier comprises:

a travel data supplier configured to transmit said travel information to said travel simulator, wherein said travel information includes one or both of a predicted travel condition and an actual travel condition; and a mapping information source configured to transmit mapping information to said travel data supplier.

13. The system of claim 12, wherein said travel information supplier further comprises at least one of:

a current traffic data source configured to transmit a current traffic data to said traffic data supplier wherein said current traffic data source includes at least one of local traffic, traffic cameras, and satellite sources; and a traffic database configured to perform one or both of transmitting said predicted traffic condition to said traffic data supplier and updating information within said traffic database with said current traffic data.

14. The system of claim 1, wherein said travel information supplier is configured to dynamically adjust said transmission of said travel information based on one or more of said plurality of user inputs and said environmental information.

15. The system of claim 1, wherein said travel simulator is further configured to output at least a tactile information.

16. A method to simulate travel, comprising:

a) receiving a plurality of inputs from a user;

b) retrieving environmental information based on said plurality of user inputs;

c) retrieving travel information based on one or more of said plurality of user inputs and said environmental information; and e) simulating travel based on one or more of said plurality of user inputs, said environmental information, and said travel information, wherein said simulating includes dynamically adjusting to deviation from planned travel routes.

17. The method of claim 16, wherein said step b) includes at least one of:

retrieving a current weather information;

retrieving a current obstruction information;

predicting a weather information; and predicting an obstruction information.

18. The method of claim 16, wherein said plurality of user inputs include simulation attributes, wherein said simulation attributes include any combinations of source, destination, time, method of travel, type of travel, and travel options.

19. The method of claim 16, wherein in step e), said simulating includes dynamically adjusting said travel based on one or more of said plurality of user inputs, said environmental information, and said travel information.

20. The method of claim 16, wherein said simulating step includes outputting at least a tactile information.

21. A travel simulating system, comprising:

a weather data supplier configured to transmit a weather information, wherein said weather information includes one of a predicted weather condition and an actual weather condition, said predicted weather condition being based on inputs from a user and information within a weather information database and said actual weather condition being based on said plurality of user inputs and current weather forecasts;

an obstruction data supplier configured to transmit an obstruction information, wherein said obstruction information includes one of a predicted obstruction condition and an actual obstruction condition, said predicted obstruction condition being based on said plurality of user inputs and information within an obstruction information database and said actual obstruction condition being based on said plurality of user inputs and current obstruction data;

a travel information supplier configured to transmit a travel information based on one or more said plurality of user inputs, said weather information, and said obstruction information, wherein said travel information includes routes; and a travel simulator configured to simulate travel based on one or more said plurality of user inputs, said weather condition, said obstruction information, and said travel information, wherein said plurality of user inputs include one or more of source, destination, time, method of travel, type of travel, and travel options, wherein said travel simulator is configured to dynamically adjust to deviation from planned travel routes.

22. The system of claim 21, wherein one or both of said weather information and obstruction information databases are updatable with said actual weather and obstruction conditions, respectively.

23. The system of claim 21, wherein said travel simulator is further configured to output at least a tactile information.

* * * * *